United States Patent
Schonfeld et al.

(10) Patent No.: US 9,323,859 B2
(45) Date of Patent: Apr. 26, 2016

(54) DYNAMIC CLIENT SIDE NAME SUGGESTION SERVICE

(71) Applicants: Daniel Schonfeld, Reston, VA (US); Jasenko Ibrahimbegovic, Reston, VA (US)

(72) Inventors: Daniel Schonfeld, Reston, VA (US); Jasenko Ibrahimbegovic, Reston, VA (US)

(73) Assignee: VERISIGN, INC., Reston, VA (US)

( * ) Notice: Subject to any disclaimer, the term of this patent is extended or adjusted under 35 U.S.C. 154(b) by 377 days.

(21) Appl. No.: 13/626,061

(22) Filed: Sep. 25, 2012

(65) Prior Publication Data

US 2013/0086081 A1    Apr. 4, 2013

Related U.S. Application Data

(60) Provisional application No. 61/542,111, filed on Sep. 30, 2012.

(51) Int. Cl.
*G06F 17/30* (2006.01)

(52) U.S. Cl.
CPC .................... *G06F 17/3089* (2013.01)

(58) Field of Classification Search
CPC ............. G06F 2221/0706; G06F 17/3053; G06F 17/30386; G06F 17/30646; G06F 17/30979
USPC .......................................................... 707/748
See application file for complete search history.

(56) References Cited

U.S. PATENT DOCUMENTS

| | | | |
|---|---|---|---|
| 7,664,831 B2 | 2/2010 | Cartmell et al. | |
| 7,921,035 B2 | 4/2011 | Adelman | |
| 7,962,438 B2 | 6/2011 | Adelman et al. | |
| 8,069,187 B2 | 11/2011 | Adelman et al. | |
| 2005/0004889 A1 * | 1/2005 | Bailey et al. | 707/1 |
| 2005/0050222 A1 * | 3/2005 | Packer | 709/238 |
| 2005/0125451 A1 | 6/2005 | Mooney | |
| 2005/0165904 A1 | 7/2005 | Mooney | |
| 2008/0307085 A1 | 12/2008 | Curran et al. | |
| 2009/0248735 A1 * | 10/2009 | Adelman et al. | 707/103 R |
| 2009/0254545 A1 | 10/2009 | Fisken | |
| 2010/0017360 A1 * | 1/2010 | Bansal et al. | 707/1 |
| 2010/0146001 A1 | 6/2010 | Lee | |
| 2010/0217842 A1 | 8/2010 | Shuster | |
| 2010/0223143 A1 | 9/2010 | Lee | |
| 2010/0325128 A1 | 12/2010 | Adelman et al. | |
| 2011/0004618 A1 * | 1/2011 | Chaudhary | 707/769 |
| 2012/0084281 A1 | 4/2012 | Colosi | |
| 2012/0096019 A1 | 4/2012 | Manickam et al. | |
| 2012/0173565 A1 | 7/2012 | Jacobs et al. | |
| 2012/0272172 A1 * | 10/2012 | Nicks et al. | 715/771 |

OTHER PUBLICATIONS

"Extended European Search Report", dated Jan. 3, 2013, European Application No. EP 12186745, filed Sep. 29, 2012, pp. 1-6, published by the European Patent Office.

* cited by examiner

*Primary Examiner* — Yuk Ting Choi
(74) *Attorney, Agent, or Firm* — MH2 Technology Law Group, LLP (57) ABSTRACT

A method for providing Internet domain name suggestions includes parsing a web page; obtaining at least one keyword from the parsing, generating a first query from the at least one keyword; and determining, based at least on the first query, if at least one name suggestion is available. The method also includes, if at least one name suggestion is available, generating at least one domain name suggestion based at least on the first query and displaying the at least one domain name suggestion.

30 Claims, 10 Drawing Sheets

High-level depiction of the system's key elements.

DYNAMIC CLIENT SIDE NAME SUGGESTION SERVICE

This application claims priority to U.S. Provisional Application No. 61/542,111, filed on Sep. 30, 2011, the disclosure of which is incorporated herein by reference in its entirety

FIELD

This disclosure is generally directed to systems and methods for suggesting Internet domain names to a user and, more particularly, using a program on an existing web page to make suggestions based on content from the web page.

BACKGROUND

Domain names are hostnames that identify Internet Protocol (IP) resources, such as web sites. Users who are owners of content to be presented on web sites often desire a descriptive domain name for their web site that suggests or relates to the web site's content. Other factors may also be desirable in a domain name, such as ease of memorizing the domain name, ease of typing, applicability across many languages and regions, search engine optimization, and length. Thus, a user may desire to register a domain name for a sports web site containing, for example, a sports term or theme. The process of domain name selection can be tedious since a user must often consider many different combinations of terms to create a desirable domain name. Even after a potential domain name is selected, it may be registered to another user or otherwise may not be available.

Typically, a user can use a name suggestion service or software, usually provided by companies or registrars, to generate domain name suggestions. A user may navigate to a registrar's name suggestion web page. The user then typically enters a set of keywords that describe web site content. The user may also enter information such as the desired top-level domain name to use (.com, .net, etc.), whether or not to use hyphens or numbers, and a maximum domain name length. The software or service then generates a list of domain name suggestions from which a user may choose.

This process can become cumbersome to a user. For example, a user may not enter all the desired keywords, or may not enter the correct keywords. A user may also forget desired keywords in the time needed for the user to navigate to the registrar's web site.

Therefore, it is desirable to introduce a tool to allow the Internet community to obtain domain name suggestions while simultaneously browsing the Internet on a general purpose content web page, not a web page specifically made for registering domain names. This would provide users with an alternative way to find and register suitable domain names, instead of requiring a user to visit a registrar's web site.

SUMMARY

Consistent with disclosed embodiments, a method, which may be performed by a processor, for providing Internet domain name suggestions, may include parsing a web page; obtaining at least one keyword from the parsing; generating a first query from the at least one keyword; and determining, based at least on the first query, if at least one name suggestion is available. The method may also include, if at least one name suggestion is available, generating at least one domain name suggestion based at least on the first query and displaying the at least one domain name suggestion.

Consistent with disclosed embodiments, a system for providing Internet domain name suggestions may include a processor and a memory containing instructions, that when executed by the processor, causes the processor to perform a method. The method may include parsing a web page; obtaining at least one keyword from the parsing; generating a first query from the at least one keyword; and determining, based at least on the first query, if at least one name suggestion is available. The method may also include, if at least one name suggestion is available, generating at least one domain name suggestion based at least on the first query and displaying the at least one domain name suggestion.

Consistent with disclosed embodiments, a non-transitory computer-readable medium storing instructions which, when executed by at least one processor, performs a method. The method may include parsing a web page; obtaining at least one keyword from the parsing; generating a first query from the at least one keyword; and determining, based at least on the first query, if at least one name suggestion is available. The method may also include, if at least one name suggestion is available, generating at least one domain name suggestion based at least on the first query and displaying the at least one domain name suggestion.

It is to be understood that both the foregoing general description and the following detailed description are exemplary and explanatory only and are not restrictive of disclosed embodiments, as claimed.

The accompanying drawings, which are incorporated in and constitute a part of this specification, illustrate embodiments of the invention and together with the description, serve to explain the principles of the claims.

DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts.

The disclosed embodiments provide methods and systems for facilitating a domain name suggestion process. The disclosed embodiments provide a dynamic approach for suggesting domain names. Such embodiments allow the Internet community to obtain name suggestions while simultaneously browsing the Internet on a general purpose content web page, without requiring a visit to a web page specifically made for registering domain names. This provides users with an alternative way to find and register suitable domain names instead of requiring a user to visit a registrar's web site.

Disclosed embodiments enable users to find and register specific domain names they like. The disclosed embodiments may be used with a conventional registrar and browser, and may run on various types of computers.

Figure 1:
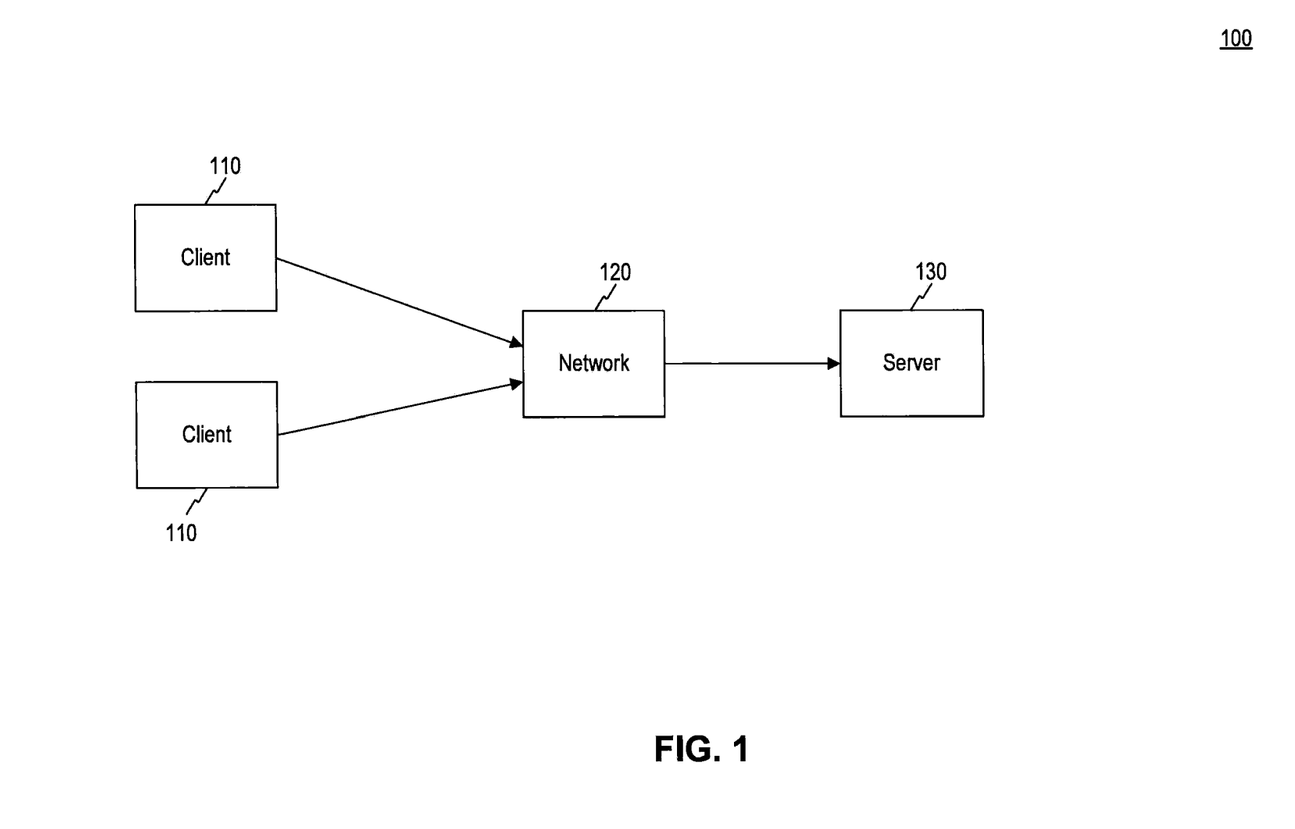
FIG. 1 is block diagram of a system for generating name suggestions, consistent with disclosed embodiments

FIG. 1 shows an exemplary system 100. System 100 includes one or more clients 110 that may use a network 120, such as the Internet, to access a server 130. Clients 110 may be embodied as personal computers, personal digital assistants, smart phones, and the like. Server 130 can be any appropriate computer system. Client 110 can send information through network 120 to server 130, and vice versa.

Client 110 can provide information, such as information for generating Internet domain name suggestions, via network 120, to server 130. Such information can include domain name keywords, geographical location, search history, and other information pertaining to domain name suggestions. Server 130 can send information, such as domain name suggestions, suggestion services, registration services, and the like to clients 110 using network 120.

Disclosed embodiments can be installed as "bookmarklets" on a user's browser. A bookmarklet, a combination of the words "bookmark" and "applet," is a computer application, which may be stored as a Universal Resource Locator (URL) in a web browser's bookmark. Hyperlinks on a web page may also point to bookmarklets to execute a bookmarklet application. A domainlet is a bookmarklet that generates domain name suggestions. Thus, in some disclosed embodiments, domain names can be generated by clicking on a domainlet, which can be a bookmarklet installed on a user's browser. Installed bookmarklets provide a user-friendly interface that allows a user to easily generate domain name suggestions from the contents of the web page being viewed by a user.

Figure 2:
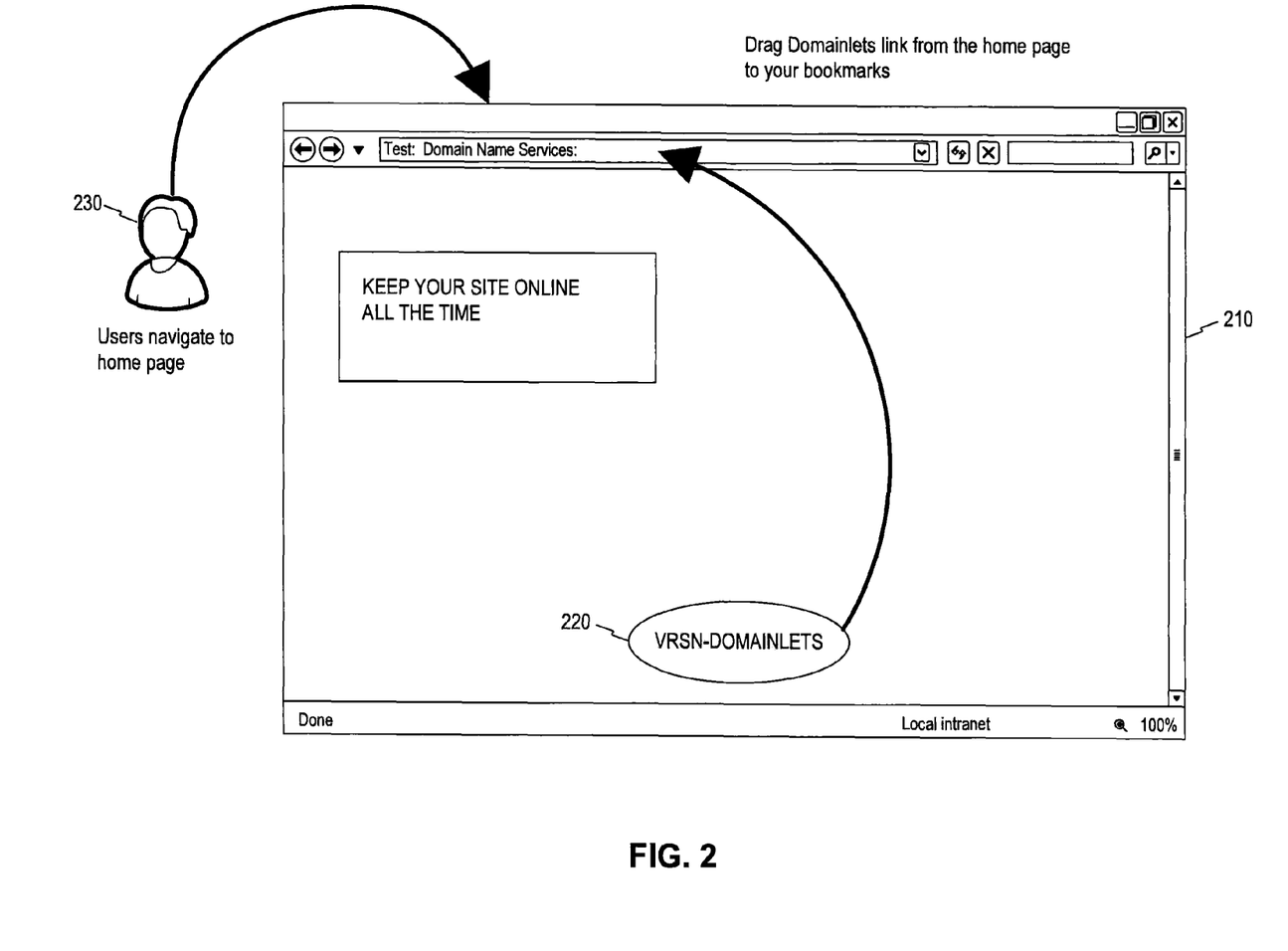
FIG. 2 is a representation of a browser page displayed to a user, consistent with disclosed embodiments.

FIG. 2 shows an exemplary embodiment of installing a domainlet onto a browser. For example, a user 230 opens a browser 210 on a computer, such as client 110, and navigates to a web page on a registrar's web site. The user drags a domainlet link 220 displayed on the web page to the user's bookmarks toolbar, thereby installing the domainlet on the computer.

Figure 3:
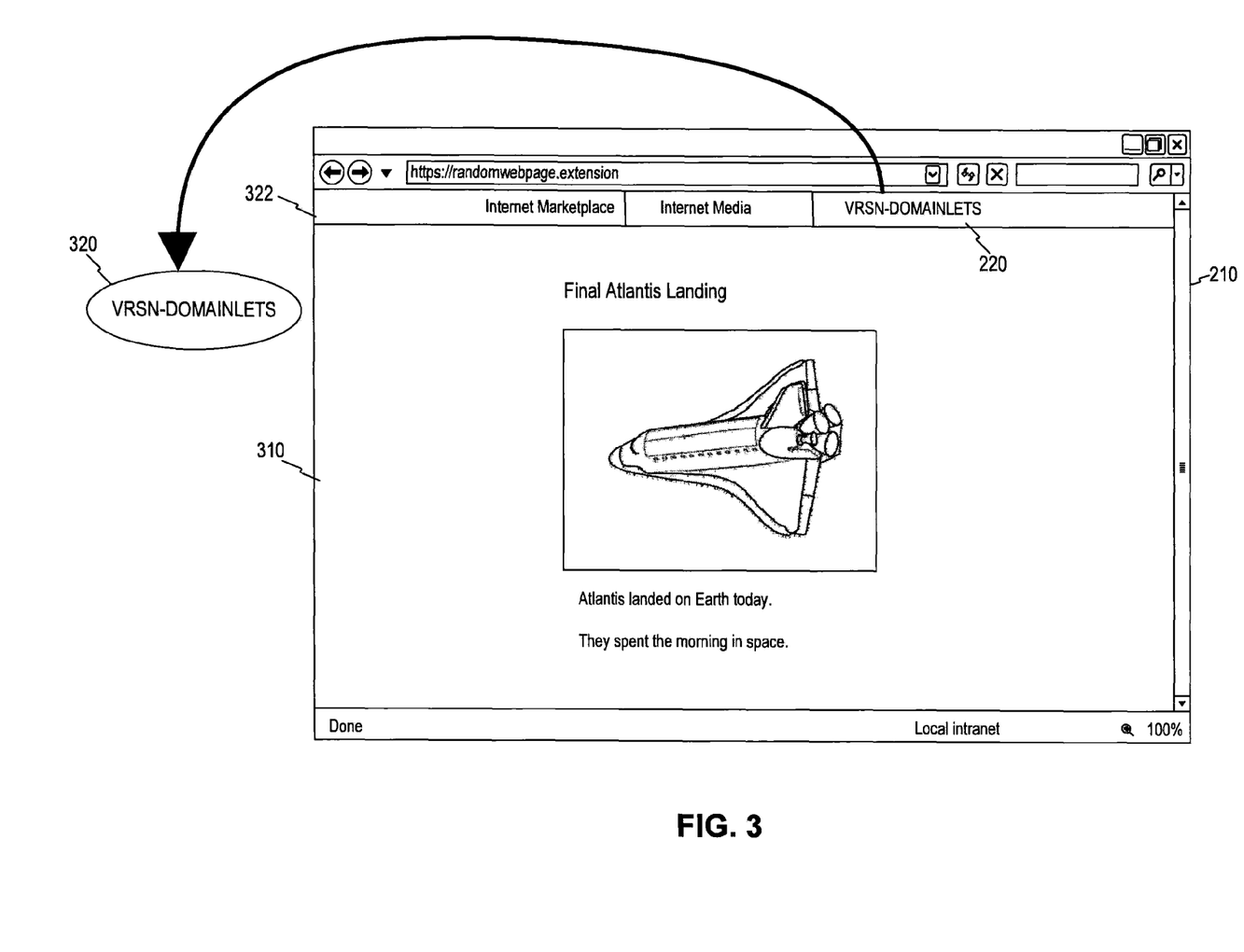
FIG. 3 is a first representation of a browser page with a domainlet installed, consistent with disclosed embodiments.

As shown in FIG. 3, a user navigates to a general purpose content web page 310. After installing the domainlet, domainlet link 220 can appear in a bookmark toolbar 322 of browser 210. Domainlet link 220 can also appear in other places, such as in a hidden menu or on a desktop. Domainlet link 220 can be a hyperlink. In some embodiments, a user can click on the domainlet link 220 to open domainlet 320 to generate and reveal domain name suggestions.

Figure 4:
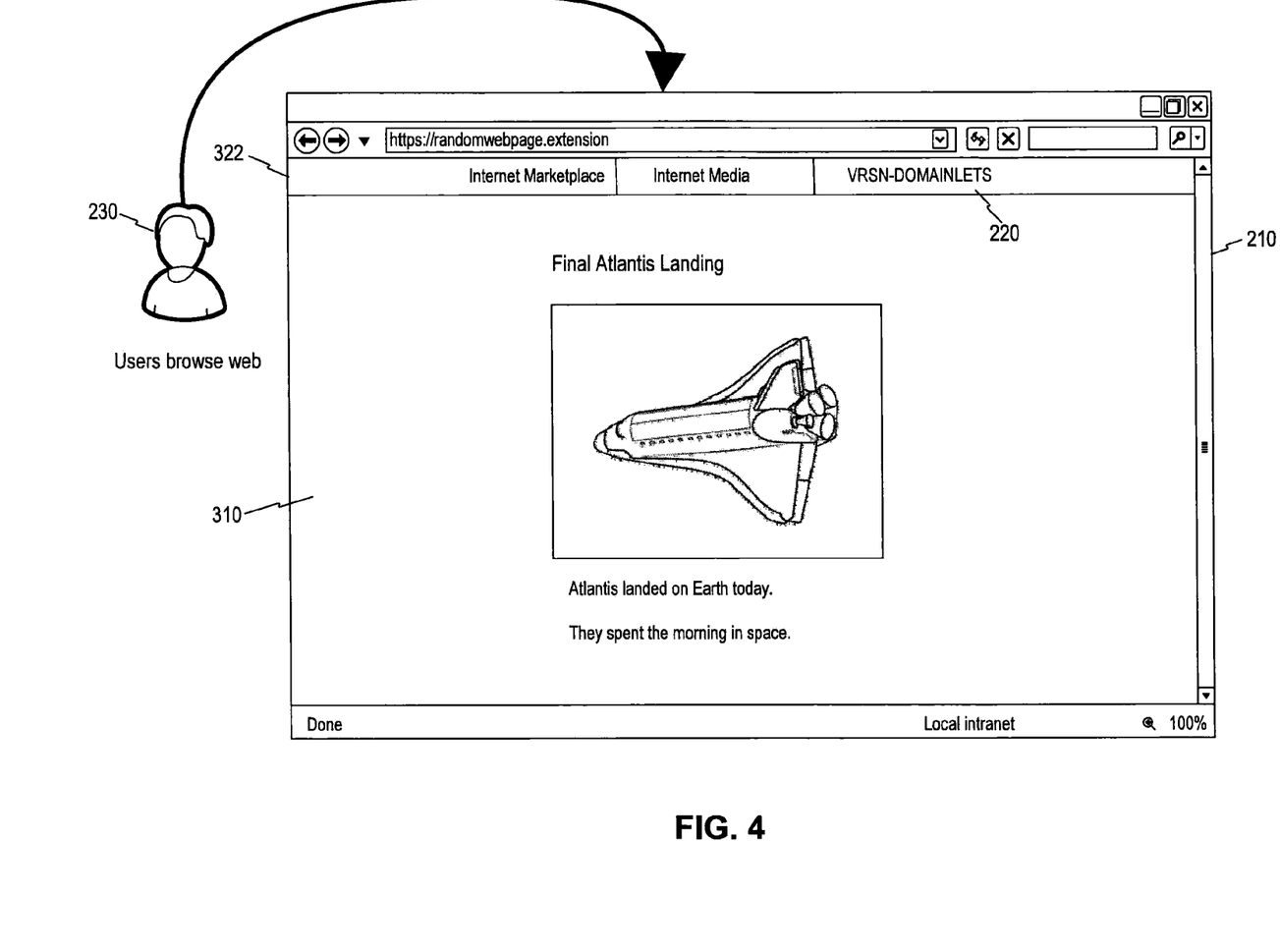
FIG. 4 is a second representation of a browser page with a domainlet installed, consistent with disclosed embodiments.

As shown in FIG. 4, after the user navigates to a web page 310, user 230 can find domainlet link 220 on bookmarks toolbar 322. A user then has the option to click on link 220 to open the domainlet application.

Figure 5:
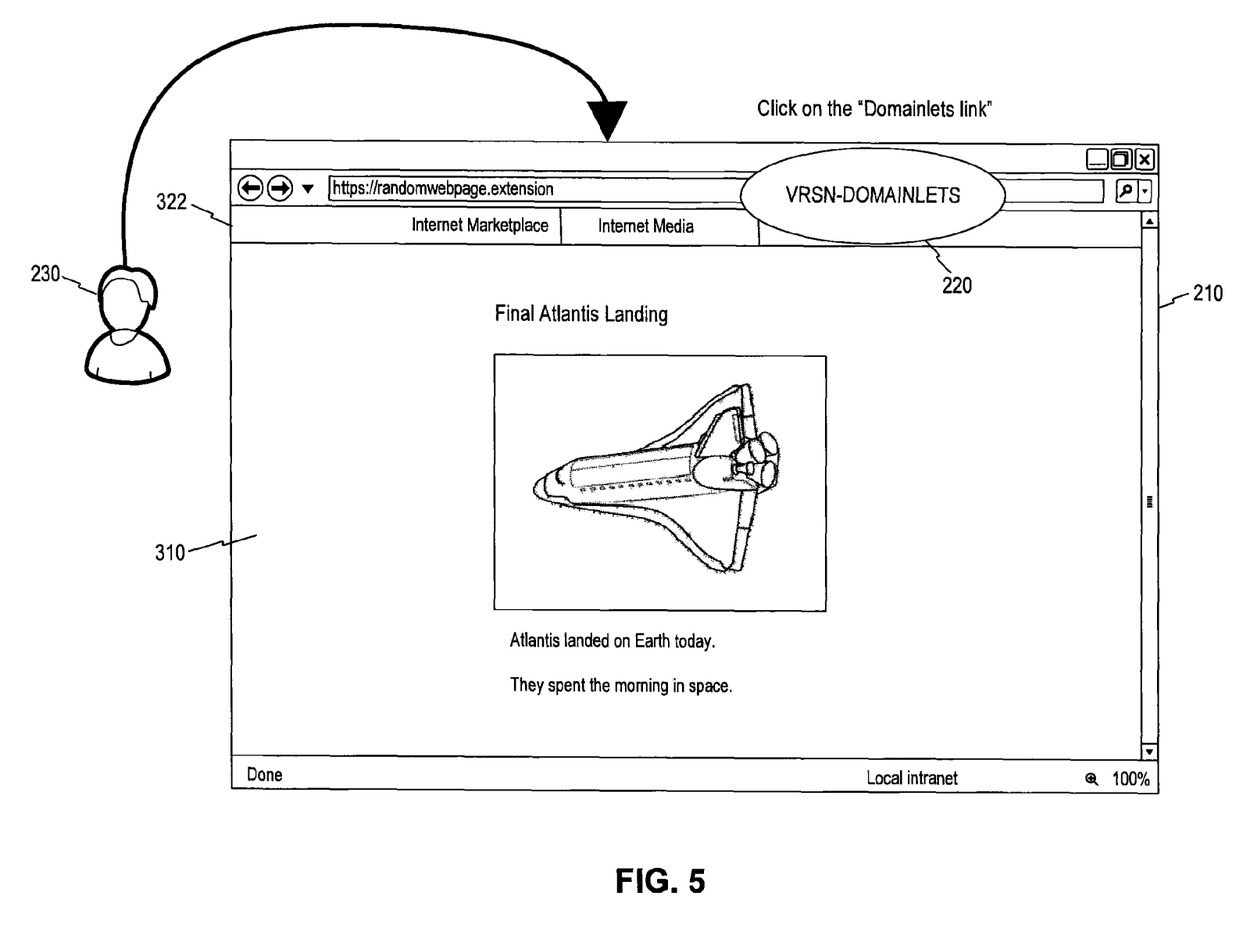
FIG. 5 is a third representation of a browser page with a domainlet installed, consistent with disclosed embodiments.

As seen in FIG. 5, the user can select the domainlet link 220, such as by clicking on it with a mouse. If using a touchscreen, a user can select by, for example, tapping the screen and the like. The domainlet application may use keywords located in or on web page 310 to generate domain name suggestions. Keywords can be derived from a title of the web page, a paragraph of the web page, a header tag of the web page, metadata of the web page, a video, an image, audio, ads, code, or other content from the web page. These keywords can be grouped as queries, where an initial query can be a default query. The queries can then be sent, using a network such as the Internet, to a domain name suggestion service to determine if any suggestions are available as a domain name. An Internet domain name suggestion service can be any service that provides name suggestions, such as domain registration services or registrars, but also can be independent third parties. If domain name suggestions are not available, a user may revise the keyword search, such as by selecting content from the web page, or by re-ranking keywords, both of which will be described below.

Figure 6:
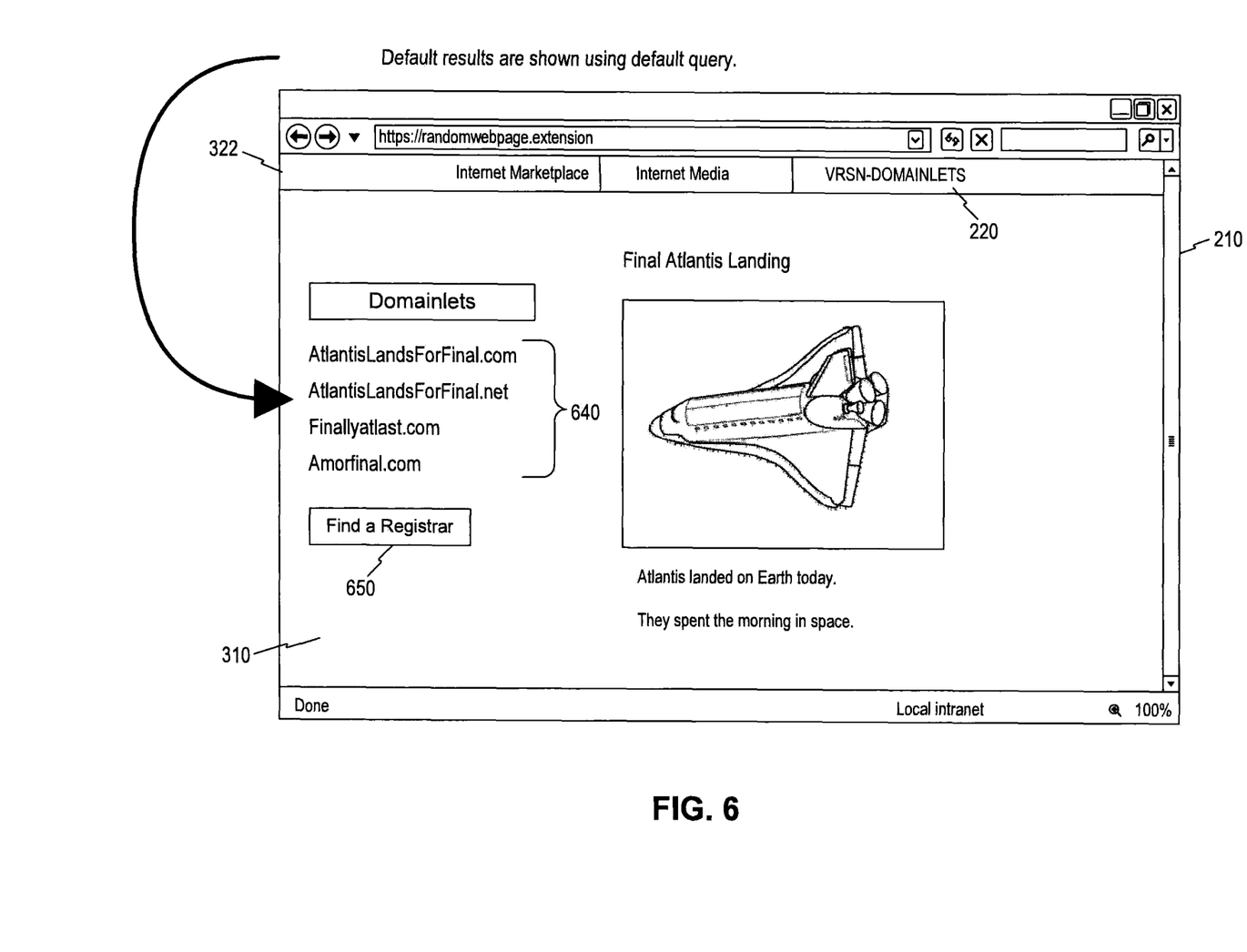
FIG. 6 is a first representation of a browser page with a domainlet installed and a name suggestion section displayed, consistent with disclosed embodiments.

In FIG. 6, after a domain name service has confirmed that domain name suggestions exist, a suggested name results section 640 may be displayed on the left side of browser page 310. However, results section 640 can be displayed anywhere on a display. Results section 640 may include a title, may overlap a part of the browser or web page, may be adjustable in size, can be moved to any other position so that anything underneath can be uncovered, or any combination thereof, and the like.

As shown in FIG. 6, the domainlet can generate default results using the default query, described above. In this example, the default results shown in section 640 are generated using keywords derived from the web page title "Final Atlantis Landing." In this example, the generated domain names can use combinations and parts of the words in the title. The default results can be based on relevance or frequency of keywords in the title, as well as other information the user may provide a name suggestion service, such a description of the web page. Various extensions, such as .com, .net, and the like, can also be generated.

A user can click on a name suggestion in results 640 to choose a particular suggestion as a desired domain name. As mentioned above, a domain name suggestion can be embodied as a hyperlink. In some embodiments, a user can select a name suggestion to later register the suggestion. The user may then search for a registrar, such as by clicking link 650 shown below the list of name suggestions. In some embodiments, if a user clicks a name suggestion, the user is brought to a registration page to register the domain name.

In the disclosed embodiments, default results derive keywords from a title of the web page, a paragraph of the web page, a header tag of the web page, metadata of the web page, a video of any format, an image of any format, audio of any format, ads, code, or other content from the web page, or combinations thereof. The default results section can show the most relevant name suggestions on a first page. Additional suggestions may be seen such as by paging through or by scrolling down the results section 640.

Figure 7:
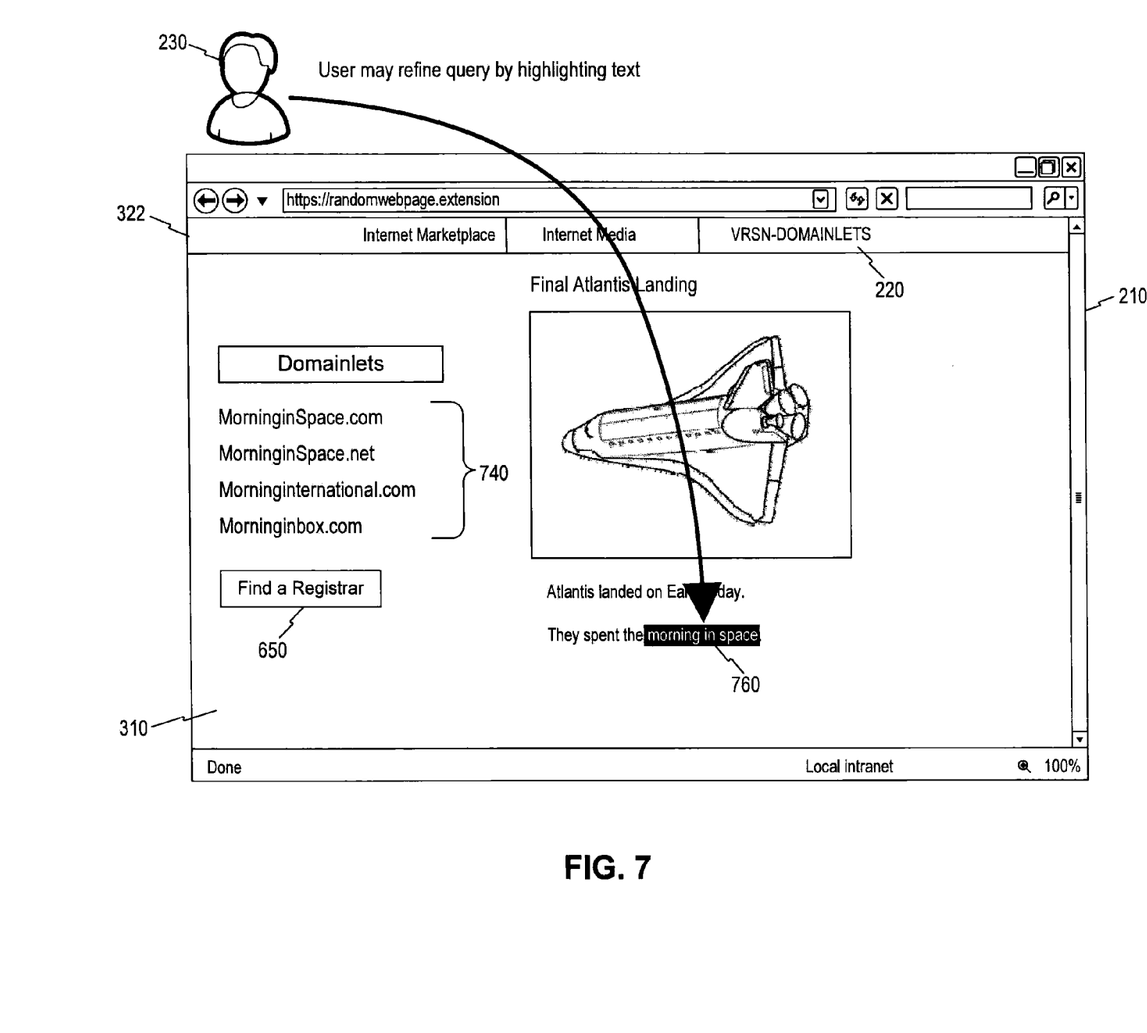
FIG. 7 is a second representation of a browser page with a domainlet installed and a name suggestion section displayed, consistent with disclosed embodiments.

As shown in FIG. 7, the user may refine the domain name suggestions by designating content, such as by highlighting text 760, appearing on or in web page 310. Designating content provides an interactive component to the domainlet. A user can designate content by selecting content in any appropriate manner. After text 760 is designated, user 230 clicks domainlet link 220, and designated text 760 is used to generate name suggestions 740. Designated content is put into a query. This query may be then used, as similarly described above, to generate domain name suggestions. This process may be done either automatically, in real-time, or manually. A designated context query can be used in combination with any previously generated queries.

For example, user 230 may navigate to a web page and click domainlet link 220. Default results may then be displayed using a default query. User 230 may then highlight text. In the automatic or real-time case, domain name suggestions can refresh as soon as the user highlights the text. This makes it easier for the user to select different combinations of words for generating suggested domain names.

In some embodiments, metadata, information from a user, and other keywords may be combined with the highlighted data to generate suggestions. In some embodiments, the suggestions remain on the screen as long as the page is not refreshed. In other embodiments, the results section can be closed by user action. In some embodiments, no further action is required by the user after the keywords have been selected. In some embodiments, other items besides text can be selected. In these embodiments, a title of the web page, a paragraph of the web page, a header tag of the web page, metadata of the web page, a video of any format, an image of any format, audio of any format, ads, code, or other content from the web page, or combinations thereof can be used to suggest domain names.

Figure 8:
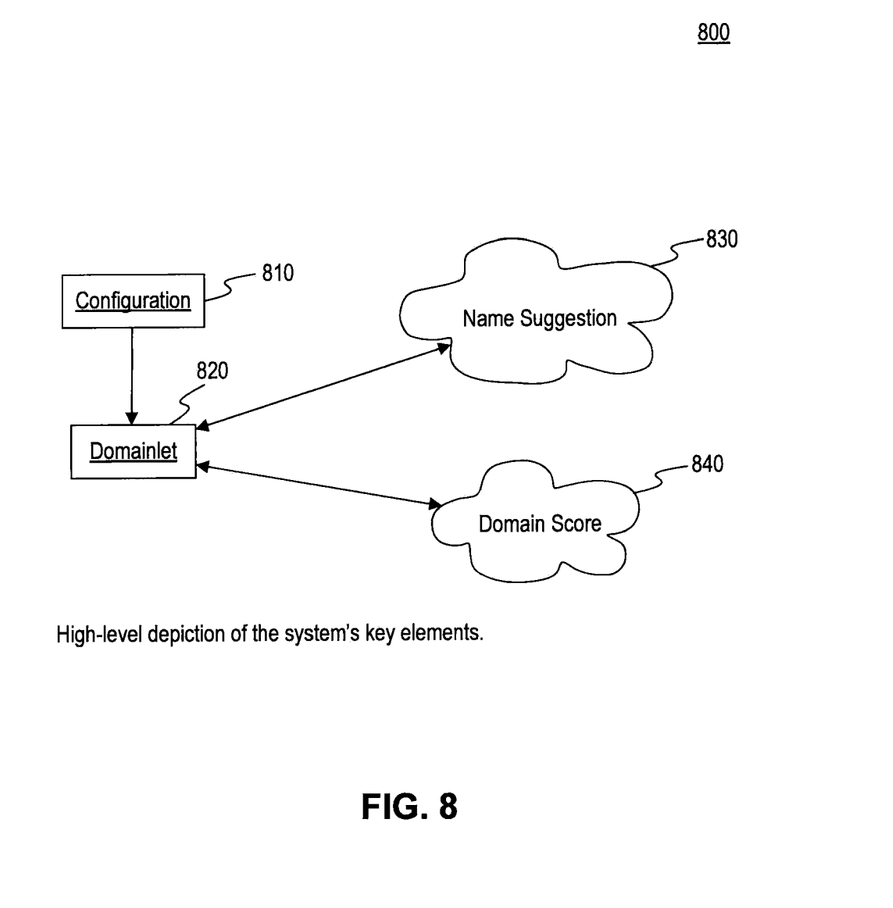
FIG. 8 is a high-level depiction of a system, consistent with disclosed embodiments.

FIG. 8 is a high-level depiction of elements of the disclosed embodiments. The configuration of the domainlet is shown at 810. The configuration can include instructions on how to display name suggestions, where to display the suggestions on a webpage, a default registrar, which keywords are used in a query, how many name suggestions to list, and the like. The domainlet, shown at 820, includes two mechanisms. The first mechanism includes generating name suggestions from a name suggestion service, shown at 830. The second mechanism includes generating a domain traffic score for name suggestions, shown at 840. The domain traffic score will be described in greater detail below.

Figure 9:
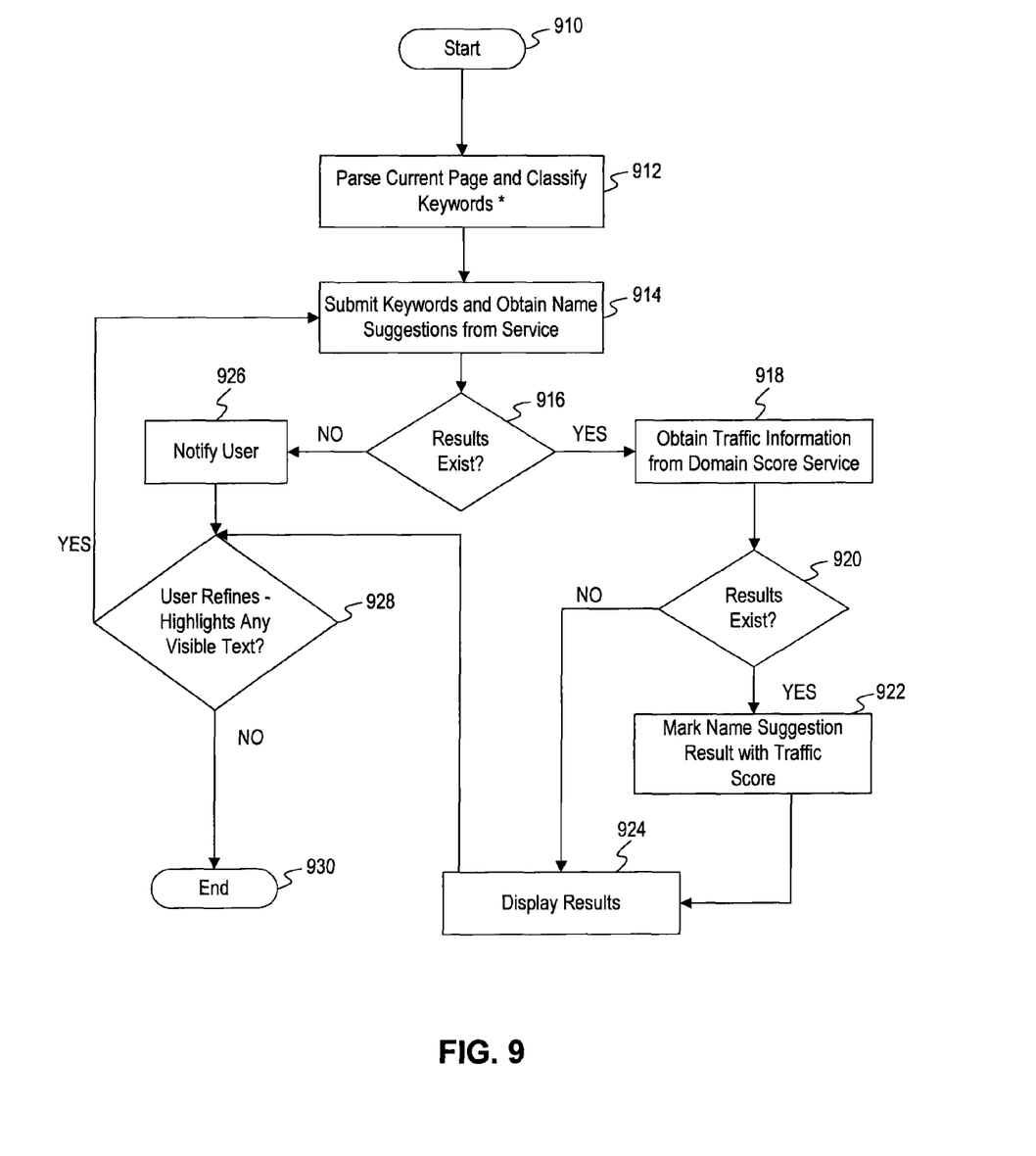
FIG. 9 is a flow chart of a method for generating name suggestions, consistent with disclosed embodiments.

FIG. 9 is a flowchart for an exemplary process for facilitating domain name selection. In disclosed embodiments, various blocks of process 900 can be rearranged or removed. Process 900 starts at block 910 when a user opens a domainlet application, such as by clicking domainlet link 220 (FIG. 5). Moving to block 912, the web page currently being accessed by the user is parsed to obtain a first, or default, set of keywords. As a result of the parsing, keywords may be obtained from a title of the web page, a paragraph of the web page, a header tag of the web page, metadata of the web page, a video of any format, an image of any format, audio of any format, ads, code, or other content from the web page, or combinations thereof. The keywords may then be sorted and ranked, such as based on occurrence and frequency of a particular keyword in the parsing results. In some embodiments, a user has the option to re-rank words based on other criteria. These keywords make up a default query.

After the parsing and classifying at block 914, a query, which contains keywords, can be submitted to a name suggestion service to obtain domain name suggestions. In some embodiments, the user may choose a specific name suggestion service by choosing a name from a list or by selecting a link on the web page.

At block 916, the suggestion service determines if any results exist, that is, if domain names are available for the current keyword query. Results may not exist due to the fact that the possible domain names are already registered. If a domain name is not available, the process moves to block 926 where the user is notified of the non-availability of the suggested domain names. Then the process moves to block 928 where the user may refine the search by highlighting web page content, such as visible text.

However, if results do exist at block 916, the process moves to block 918 to obtain traffic information from a domain traffic score service. The domain traffic score service can be the same service that provides the name suggestions. The domain traffic score can measure, for example, the reliability and quantity of any type of web traffic, such as keyword search traffic or domain name system (DNS) traffic. DNS traffic may be traffic from, for example, other users, bots, and search crawlers, for each domain name suggestion. DNS traffic includes situations where a user has typed in an incorrect domain name, a bot or crawler has been detected searching domain names, and other situations where domain names have been searched for or entered into a browser. The traffic score generally provides the amount of traffic for a particular domain name suggestion. Thus, it can determine a popularity of a domain name suggestion.

At block 920, it is determined if any of the name suggestions have a domain traffic score. It is possible to have such a very small traffic score that it can be insignificant in terms of DNS traffic. If domain traffic score results do not exist, the process moves to block 924 where the name suggestion results are displayed for the user, either in a random or ranked order. If domain traffic score results do exist for some of the name suggestions, the process moves to block 922 where these name suggestion results can be associated and marked with a traffic score. The name suggestions with higher scores may be ranked near the top of a list, which can then be displayed to the user, shown at block 924. Here, the top results can be displayed first. The user can move through a descending ranked list to see additional suggestions.

After block 924, the process moves to block 928. At block 928, the user can refine the query by highlighting content, such as visible text, from the web page. For example, if the user chooses to highlight visible text, keywords can be determined from the contents of the highlighted text, and entered into a query back at block 914. Process 900 can then continue by either using a previous query, such as a default query which may be stored on a computer or in the browser's cache, using a newly generated query, which may include highlighted content, or combinations thereof. In some embodiments, the highlighted content can be combined with previous queries and keywords, and used in process 900.

If the user does not highlight any web page content, the process ends at block 930. In some embodiments, the results can be displayed as text in a list, such as results section 640. The user may now chose a name suggestion to register, or may visit another web page to start the process over again. In some embodiments, a user can use a registration service to buy or register a selected name suggestion. Thus, in some embodiments, clicking on any name suggestion can result in a default registration service being accessed. The domain name suggestions can be displayed as hyperlinks that point to a registration service of a default registrar. A user may select a registrar, such as by clicking link 650, shown in FIG. 7.

Figure 10:
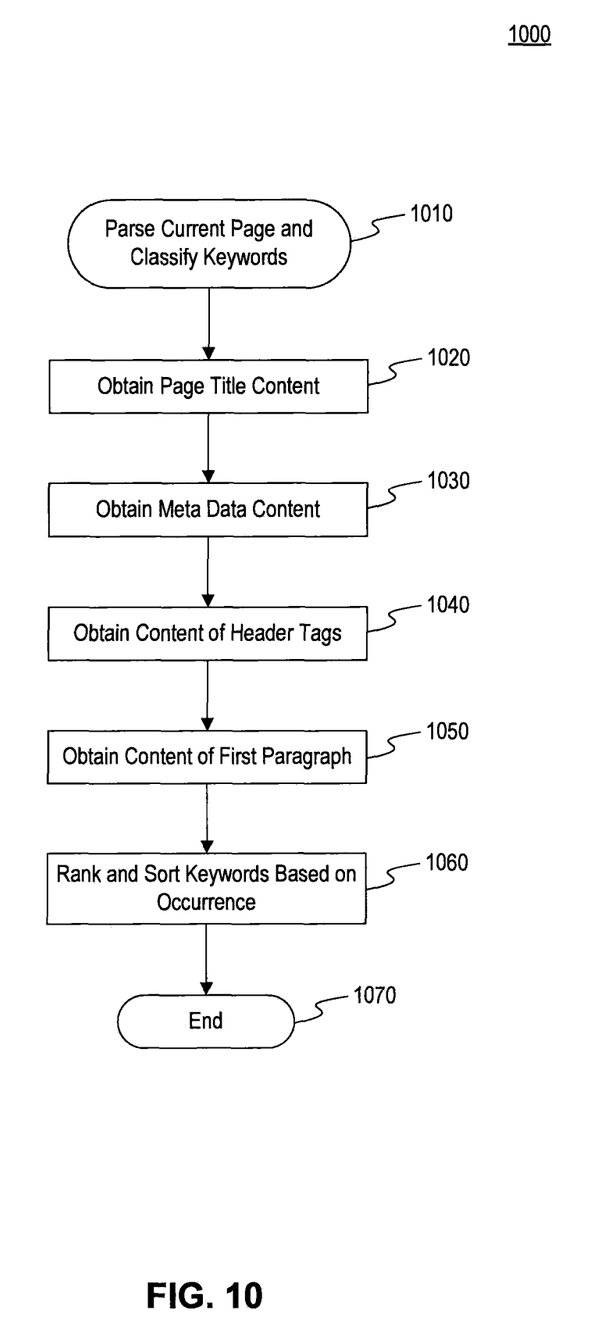
FIG. 10 is a flow chart for obtaining keywords used in generating name suggestions, consistent with disclosed embodiments.

FIG. 10 is a detailed flow chart of the parsing and classifying shown at block 912 of FIG. 9. In disclosed embodiments, various blocks of process 1000 can be rearranged or taken out. Process 1000 begins at block 1010 where the current web page is parsed and keywords, as described above, can be classified. At block 1020, the page title content is obtained. At block 1030, the metadata content is obtained. At block 1040, the content of any header tags is obtained. At block 1050, the content of the first paragraph is obtained. At block 1060, the keywords can ne ranked and sorted, for example, based on their frequency of occurrence on the web page. The process ends at block 1070. Additional keywords may be entered and used in process 100.

In the disclosed embodiments, a geographic location may be used to suggest names that relate to the location of a user. This may provide more relevant results for a user.

In some embodiments, a user can submit an email to a name suggestion service, requesting a scan of a page the user is currently viewing, on behalf of the user. The service can then scan or crawl the page, and then send name suggestions and other data obtained and analyzed, such as by an offline process, to the user. A user may want to do this because malicious data may be on a web site, thus rendering the user vulnerable to such a threat.

Disclosed embodiments can relay relevant information to the name suggestion service. It is possible to track information associated with the domainlet. For example, when a user generates name suggestions, information such as the actual usage of the domainlet by a particular user, IP address of a user, geolocation of a user, and the like can be tracked and saved for offline processing. As a result of the offline processing, the information can be sent to the name suggestion service for tracking purposes. This allows the name suggestion service to see and use, for example, what kinds of domain names may interest users, and what kind of web sites users visit. This information can then be used to provide more relevant suggestions.

Disclosed embodiments can send browser history to a name suggestion service. When a user generates name suggestions using the domain let, the history can be saved, and can be sent to the name suggestion service in an offline process in the form of a report. Such information may include, for example, which pages are frequented the most, whether the client is from a particular business, or if the user is using a private computer, and the like. This information can help suggest more relevant domain name suggestions to a user.

Disclosed embodiments can send relevant data back to a name suggestion service together with a set of keywords used to generate particular name suggestions. Such data could be used in a usage pattern analysis in order to determine the types of users interacting with the domainlet and also to figure out the more frequently visited web pages. Knowing such information can provide more relevant name suggestions for the user. The collected data can then be used to capture the more popular pages amongst users who are using the domainlet, the actual generated name of the name suggestions, and what domain names are being actually registered by using the domainlet.

Disclosed embodiments include computer systems having a processor and computer-readable storage media that include code for instructions to perform disclosed processes. Disclosed embodiments can include various types of computer-readable memory or storage devices, such as a random access memory, a read-only memory, a mass storage device such as a hard disk, a CD, a DVD, and the like. Disclosed embodiments can include monitors, track balls, mice, keyboards, and the like. Disclosed embodiments can be connected to computers, cell phones, and other systems using a network. Various computers and systems can exchange information among the network. Disclosed embodiments can be deployed on any operation system or platform such as Linux based operating systems.

Other embodiments of the invention can be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, performed by a processor, for providing Internet domain name suggestions, comprising:
   opening a web page on a browser in response to a user selection of a link, wherein the web pace includes visible content;
   automatically parsing the web page;
   obtaining at least one keyword from the parsing;
   generating a first query from the at least one keyword;
   generating a plurality of domain name suggestions based at least on the first query;
   determining a plurality of domain traffic scores for the plurality of domain name suggestions;
   providing ranked domain name suggestions that includes one or more of the plurality of domain name suggestions ranked based on the plurality of domain traffic scores associated with the plurality of domain name suggestions;
   displaying one or more of the ranked domain name suggestions;
   receiving a user-highlighted portion of the visible content of the web page displayed during the parsing;
   refining the first query with one or more keywords derived from the user-highlighted portion of the visible content to generate a second query, wherein the user-highlighted portion of the visible content comprises at least one of a title of the web page, text in the web page, an image in the web page, or an advertisement in the web page;
   generating one or more domain name suggestions based on the second query; and
   providing the one or more domain name suggestions.

2. The method of claim 1, further comprising:
   ranking contents returned in response to the first query based on occurrence of a keyword to generate ranked contents; and
   generating the at least one domain name suggestion based on the ranked contents.

3. The method of claim 1, further comprising submitting at least the first query to an Internet domain name suggestion service for generating the at least one domain name suggestion.

4. The method of claim 1, wherein the at least one keyword includes content from at least one of a title of the web page, a paragraph of the web page, a header tag of the web page, metadata of the web page, text, a video, an image, audio, ads, or other content from the web page.

5. The method of claim 1, further comprising generating the at least one domain name suggestion automatically.

6. The method of claim 1, further comprising generating the at least one domain name suggestion in real-time.

7. The method of claim 1, further comprising generating the at least one domain name suggestion manually.

8. The method of claim 1, further comprising using at least one of a geographical location, contents of a search history, an IP address, or other relevant information to generate the at least one domain name suggestion.

9. The method of claim 1, further comprising:
   if at least one name suggestion is not available:
      providing a notification that no domain name suggestion is available.

10. The method of claim 1, further comprising:
    providing a domain name suggestion application separate from the web page, wherein the domain name suggestion application performs the parsing, the obtaining, the generating the first query, the determining, the refining, and the generating the one or more domain name suggestions, and wherein the providing further comprises providing the one or more domain name suggestions in the web page.

11. A system for providing Internet domain name suggestions comprising:
    a processor; and
    a memory containing instructions, that when executed by the processor, causes the processor to perform a method comprising:
       opening a web page on a browser in response to a user selection of a link, wherein the web page includes visible content;
       automatically parsing the web page;
       obtaining at least one keyword from the parsing;
       generating a first query from the at least one keyword;
       generating a plurality of domain name suggestions based at least on the first query;
       determining a plurality of domain traffic scores for the plurality of domain name suggestions;

providing ranked domain name suggestions that includes one or more of the plurality of domain name suggestions ranked based on the plurality of domain traffic scores associated with the plurality of domain name suggestions;

displaying the ranked domain name suggestions;

receiving a user-highlighted portion of the visible content of the web page displayed during the parsing;

refining the first query with one or more keywords derived from the user-highlighted portion of the visible content to generate a second query, wherein the user-highlighted portion of the visible content comprises at least one of a title of the web page, text in the web page, an image in the web page, or an advertisement in the web page;

generating one or more domain name suggestions based on the second query; and providing the one or more domain name suggestions.

12. The system of claim 11, the method further comprising:

ranking contents returned in response to the first query based on occurrence of a keyword to generate ranked contents; and generating the at least one domain name suggestion based on the ranked contents.

13. The system of claim 11, the method further comprising submitting at least the first query to an Internet domain name suggestion service for generating the at least one domain name suggestion.

14. The system of claim 11, wherein the at least one keyword includes content from at least one of a title of the web page, a paragraph of the web page, a header tag of the web page, metadata of the web page, text, a video, an image, audio, ads, or other content from the web page.

15. The system of claim 11, the method further comprising generating the at least one domain name suggestion automatically.

16. The system of claim 11, the method further comprising generating the at least one domain name suggestion in real-time.

17. The system of claim 11, the method further comprising generating the at least one domain name suggestion manually.

18. The system of claim 11, the method further comprising using at least one of a geographical location, contents of a search history, an IP address, or other relevant information to generate the at least one domain name suggestion.

19. The system of claim 11, the method further comprising:

if at least one name suggestion is not available:

providing a notification that no domain name suggestion is available.

20. The system of claim 11, the method further comprising:

providing a domain name suggestion application separate from the web page, wherein the domain name suggestion application performs the parsing, the obtaining, the generating the first query, the determining, the refining, and the generating the one or more domain name suggestions, and wherein the providing further comprises providing the one or more domain name suggestions in the web page.

21. A non-transitory computer-readable medium storing instructions which, when executed by at least one processor, performs a method, the method comprising:

opening a web page on a browser in response to a user selection of a link, wherein the web page includes visible content;

automatically parsing the web page;

obtaining at least one keyword from the parsing;

generating a first query from the at least one keyword;

generating a plurality of domain name suggestions based at least on the first query;

determining a plurality of domain traffic scores for the plurality of domain name suggestions;

providing ranked domain name suggestions that includes one or more of the plurality of domain name suggestions ranked based on the plurality of domain traffic scores associated with the plurality of domain name suggestions;

displaying the ranked domain name suggestions;

receiving a user-highlighted portion of the visible content of the web page displayed during the parsing;

refining the first query with one or more keywords derived from the user-highlighted portion of the visible content to generate a second query, wherein the user-highlighted portion of the visible content comprises at least one of a title of the web page, text in the web page, an image in the web page, or an advertisement in the web page;

generating one or more domain name suggestions based on the second query; and providing the one or more domain name suggestions.

22. The computer-readable medium of claim 21, the method further comprising:

ranking contents returned in response to the first query based on occurrence of a keyword to generate ranked contents; and generating the at least one domain name suggestion based on the ranked contents.

23. The computer-readable medium of claim 21, the method further comprising submitting at least the first query to an Internet domain name suggestion service for generating the at least one domain name suggestion.

24. The computer-readable medium of claim 21, wherein the at least one keyword includes content from at least one of a title of the web page, a paragraph of the web page, a header tag of the web page, metadata of the web page, text, a video, an image, audio, ads, or other content from the web page.

25. The computer-readable medium of claim 21, the method further comprising generating the at least one domain name suggestion automatically.

26. The computer-readable medium of claim 21, the method further comprising generating the at least one domain name suggestion in real-time.

27. The computer-readable medium of claim 21, the method further comprising generating the at least one domain name suggestion manually.

28. The computer-readable medium of claim 21, the method further comprising using at least one of a geographical location, contents of a search history, an IP address, or other relevant information to generate the at least one domain name suggestion.

29. The computer-readable medium of claim 21, the method further comprising:

if at least one name suggestion is not available:

providing a notification that no domain name suggestion is available.

30. The computer-readable medium of claim 21, the method further comprising:

providing a domain name suggestion application separate from the web page, wherein the domain name suggestion application performs the parsing, the obtaining, the generating the first query, the determining, the refining, and the generating the one or more domain name suggestions, and wherein the providing further comprises providing the one or more domain name suggestions in the web page.

* * * * *